United States Patent [19]
Sato

[11] 4,434,999
[45] Mar. 6, 1984

[54] LEG PROTECTOR OF AUTOMOTIVE VEHICLE
[75] Inventor: Yoshimi Sato, Yokohama, Japan
[73] Assignee: Nissan Motor Co., Ltd., Kanagawa, Japan
[21] Appl. No.: 301,121
[22] Filed: Sep. 11, 1981
[30] Foreign Application Priority Data
  Sep. 12, 1980 [JP] Japan .............................. 55-129986[U]
  Sep. 19, 1980 [JP] Japan .............................. 55-133502[U]
[51] Int. Cl.³ ............................................... B60R 21/02
[52] U.S. Cl. .................................................... 280/752
[58] Field of Search ............... 280/748, 750, 751, 752; 180/90

[56] References Cited
U.S. PATENT DOCUMENTS
3,930,665  1/1976  Ikawa ................................. 280/751
3,947,056  3/1976  Schwanz ........................... 180/90 X
3,964,578  6/1976  Campbell et al. ............... 280/752 X
4,065,157 12/1977  Abe et al. ............................ 280/751
4,194,762  3/1980  Sudo ................................... 280/751
4,320,909  3/1982  Nakamori et al. .................. 280/752
4,349,214  9/1982  Inasawa et al. ................. 280/750 X FOREIGN PATENT DOCUMENTS
55-121751  8/1980  Japan .
1436175  5/1976  United Kingdom ................ 280/748

Primary Examiner—Joseph F. Peters, Jr.
Attorney, Agent, or Firm—Lowe, King, Price & Becker

[57] ABSTRACT

A leg protector of an automotive vehicle, comprises first and second side plate members securely connected to a vehicle body and located generally between a steering column and legs of a driver, the first and second side plate members being laterally aligned with and spaced apart from each other, and a central plate member located facing the steering column and fastened onto the first and second side plate members, forming connecting sections. The mechanical strength of at least one of the central plate member and each connecting section is set less than that of first and second side plate members.

23 Claims, 12 Drawing Figures

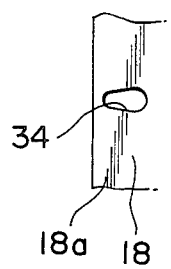
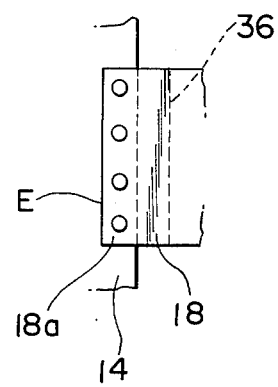
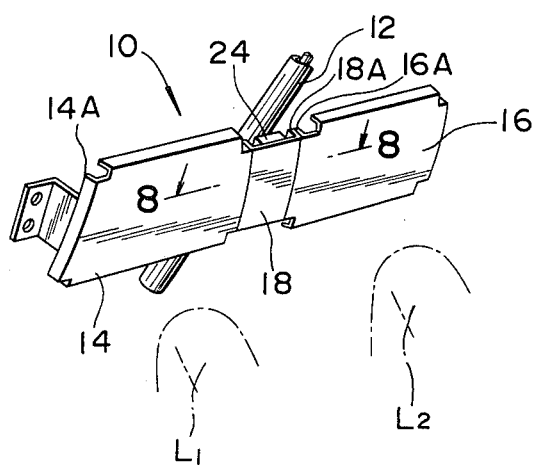
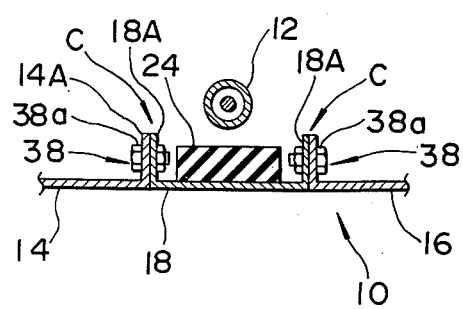

LEG PROTECTOR OF AUTOMOTIVE VEHICLE

BACKGROUND OF THE INVENTION

1. Field of the Invention

This invention relates to a vehicle safety device for protecting a vehicle occupant, and more particularly to a leg protector for protecting legs, particularly knees, of a vehicle driver.

2. Description of the Prior Art

In connection with vehicle safety systems for protecting vehicle occupants within a passenger compartment of an automotive vehicle, a variety of systems have been proposed in which a safety seat belt arrangement are employed in many automotive vehicles. Such safety seat belt arrangement uses a seat belt which prevents a vehicle occupant from being thrown forward or injured in case of an accident or collision of the vehicle. Additionally, in order to attain a further security of the vehicle occupant, particularly a vehicle driver, a leg or knee protector has been already proposed to protect the legs of the vehicle occupants, for example, during vehicle collision. The leg protector is usually designed to be collapsible so as to absorb the shock of the occupant's legs when the legs strike against the protector during vehicle collision.

BRIEF SUMMARY OF THE INVENTION

In accordance with the present invention, a leg protector in an automotive vehicle, comprises of first and second side plate members securely connected to a vehicle body and located generally between a steering column and legs of a vehicle driver. The first and second side plates are in lateral alignment with and spaced apart from each other. The leg protector further consists of a central plate member located facing the steering column and disposed contacting with both the first and second side plate members. The central plate member is fastened at connecting sections onto the first and second side plate members and so arranged that the mechanical strength of at least one of the central plate member and each connecting section is less than that of each of first and second side plate members. With this leg protector arrangement, the impact energy of the vehicle driver's legs can be effectively absorbed during a vehicle frontal collision before the driver's legs strike the steering column, thereby effectively protecting the driver's legs.

BRIEF DESCRIPTION OF THE DRAWINGS

The features advantages of the leg protector according to the present invention will be more appreciated from the following description taken in conjunction with the accompanying drawings in which like reference numerals designate corresponding parts and elements, in which:

FIG. 5 is a fragmentary view similar to FIG. 4, but showing a further modified example of the central plate member;

FIG. 6 is a fragmentary view showing a still further modified example of the central plate member;

FIG. 7 is a perspective view of a third embodiment of the leg protector in accordance with the present invention;

FIG. 8 is a transverse cross section, partly omitted, taken in the direction of the arrows substantially along the line 8—8 of FIG. 7;

DETAILED DESCRIPTION OF THE EMBODIMENTS OF THE INVENTION

Figure 1:
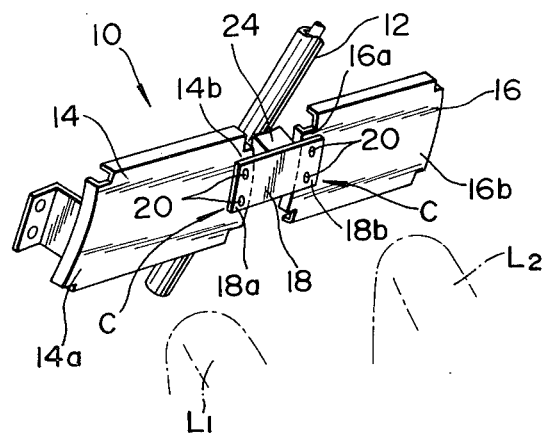
FIG. 1 is a perspective view of a first embodiment of a leg protector in accordance with the present invention.

Referring now to FIG. 1, leg protector 10 of the invention is disposed within a passenger compartment of the automotive vehicle and located generally between a steering column 12 and legs $L_1$, $L_2$ of a driver. The steering column 12 is as usual provided at an upper end thereof with a steering wheel (not shown), and is connected at the lower end to steering gear (also not shown). Leg protector 10 faces the knees of the driver so as to serve as an energy absorbing member and comprises left and right side plate members 14, 16 of generally rectangular form. left and right side plate members 14, 16 are laterally aligned with each other, i.e. aligned parallel with a floor (not shown) of the automotive vehicle, in which the left and right side plates respectively face the left and right knee of the driver. Members 14, 16 are located other to form a space therebetween, and positioned generally at opposite sides of the steering column.

A central plate member 18 connects left and right side members 14, 16 and extends over the space formed therebetween side end sections 18a, 18b of central plate member 18 overlap respectively with side end sections 14b, 16a of the left and right side plate members 14, 16 and are fixed thereto by means of spot weldings 20, so that the central plate member is positioned facing steering column 12. Accordingly, each side end section 18a, 18b forms part of a connecting section C. Opposite side ends 14a, 16b of left and right side plate members 14, 16 are connected through brackets 22 with a vehicle body (no numeral). It is to be noted that central plate member 18 is smaller in thickness than left and right side plate members 14, 16 so that the rigidity of the central plate member is lower than that of the side plate members. Additionally, the binding force (rigidity or mechanical strength) between central plate member 18 and each side plate member 14, 16 is set lower than the rigidity of the central plate member. This binding force of central plate member 18 to side plate members 14, 16 is suitably adjustable by varying the number of welding-spots 20 to be made in case where the connections among the plate members 14, 16, 18 are made by the spot weldings, or by varying the number of rivets in case where the same connection is made by riveting.

In this embodiment, the rigidity or mechanical strength of both the central plate member 18 and each connecting section C are lower than that of both the left and right side plate members 14, 16. However, it is sufficient that either one of the central plate member 18 and the connecting section C is made lower in rigidity than the left and right side plate sections 14, 16. As will be appreciated, the rigidity of the central plate member is adjustable by varying the thickness thereof, and the rigidity of connecting sections C is adjustable by varying the number of spot weldings or the like. Additionally, an energy absorbing pad 24 is attached to central plate member 18 facing steering column 12 to absorb an impact energy of the driver in cooperation with member 14, 16, 18.

In a head-on collision of the automotive vehicle, the driver moves forward under inertia and accordingly the driver's legs $L_1$, $L_2$ are pushed forward. When legs $L_1$, $L_2$ strike against left and right side members 14, 16 respectively, an impact energy is first absorbed by the left and right side members and thereafter the leg impact energy applied on the side members are concentrated into central plate member 18, lower in rigidity than the side plate members, to deform the central plate member. Simultaneously, one or both of the connecting sections C may deform. In this stage, almost all the impact energy can be absorbed by deformation, such as bending, breakage etc. of central plate member 18, or breakage of connecting sections C.

When all the impact energy is thus absorbed by the breakage, etc. of the central plate member 18, the legs $L_1$, $L_2$ of the driver are prevented from striking against a high rigidity section within the passenger compartment compartment behind leg protector 10. Otherwise, even if part of the impact energy is present after breakage of central plate member 18, it is completely absorbed by elastic deformation of energy absorbing pad 24 and accordingly the legs of the driver never strike against the high rigidity section. Thus, the impact energy of the driver's legs during vehicle collision is certainly absorbed by plate members 14, 16, 18 and energy absorbing pad 24. As a result, the driver's legs are prevented from directly striking against the steering column 12, thereby protecting the driver's legs, particularly knees.

Even when either one of left or right legs $L_1$, $L_2$ strikes against central plate member 18 as during a diagonally frontal vehicle collision, the central plate member is directly bent or broken down, or a connecting section C (18a, 18b) thereof is peeled off from side plate members 14, 16 by an impact energy of the driver's legs $L_1$, $L_2$ and therefore almost all the impact energy is consumed and absorbed by the breakage etc. of central plate member 18. As a result, the driver's leg is effectively prevented from striking against the steering column 12 like in the above-mentioned head-on collision, thereby effectively protecting the driver's legs. Additionally, in this diagonally frontal collision, since the impact energy acts diagonally forward relative to the vehicle cruising direction from the driver's side, uniform loads are not applied to both the side end sections 18a, 18b of the central plate member 18, thereby peeling off only one of the central plate member side end sections 18a, 18b from the side plate member 14, 16 whereas the other side end section remains in contact with side plate member.

Figure 2:
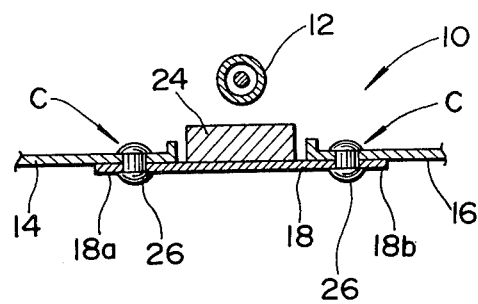
FIG. 2 is a transverse cross section, partly omitted, of a second embodiment of the leg protector in accordance with the present invention.

FIG. 2 illustrates a second embodiment of the leg protector according to the present invention. In this embodiment, the side end sections 18a, 18b are fixed onto left and right side members 14, 16, respectively, by rivets 26. Additionally, the rigidity or mechanical strength of both side end sections 18a, 18b due to the rivet connections is lower than those of the left and right side end members 14, 16. Also with this embodiment, during frontal vehicle collision, breakage etc. of leg protector 10 takes place at either one or both of the central plate member itself and each connecting section C (including rivets 26) as in the embodiment shown in FIG. 1. As a result, the driver's legs are effectively prevented from striking against steering column 12, thereby certainly protecting the driver's legs. Other constructions and the operation of this embodiment are the same as in the embodiment shown in FIG. 1 and accordingly the explanation thereof will be omitted for the purpose of simplicity of illustration.

Figure 3:
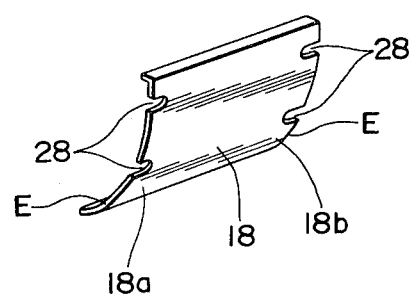
FIG. 3 is a perspective view of a modified example of a central plate member of the leg protector according to the present invention.

FIG. 3 shows a modified example of central plate member 18 of the present invention, in which each side end section 18a, 18b is formed with a pair of elongate openings 28 each of which extends laterally or in the longitudinal direction of leg protector 10 and is open at its side edge E of central plate member 18 clearly shown in FIG. 3. For an actual use of this central plate member 18, the side end sections 18a, 18b are fixed respectively onto side plate members 14, 16, for example, by bolt-nut connections or rivet connections in which a bolt or a rivet is located within each elongate opening 28. It will be understood that the frictional force generated between central plate member 18 and each side plate member 14, 16 increases the rigidity or mechanical strength of both side end sections 18a, 18b. Accordingly, during frontal vehicle collision, when the driver's legs strike respectively against the left and right side plate members, the impact energy of the driver's legs are absorbed by the above-mentioned frictional force. In other words, since the above-mentioned frictional force is set lower than the rigidity of both the side plate members 14, 16, the stresses resisting the impact energy concentrates into the above-mentioned connecting sections C, so that the impact energy is absorbed by being converted into the force which is necessary for releasing the connection of connecting sections C due to frictional force. As will be understood, central plate member 18 is connected through elongate openings 28 onto left and right plate members 14, 16 by bolts, etc. supported on the plate members, so that only the frictional force therebetween is the resistance for releasing the connection therebetween and therefore the selection of rigidity of the central plate member is not so important with the example of FIG. 3.

Figure 4:
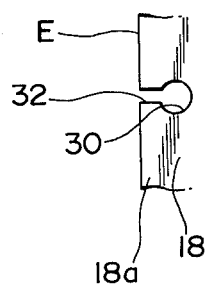
FIG. 4 is a fragmentary view of a side end section of another modified example of the central plate member.

FIG. 4 shows another modified example of central plate member 18 of the present invention, in which each side end section 18a, 18b is formed with circular openings 30 each of which opens to the side edge E thereof through a slit 32 which is formed laterally or in the longitudinal direction of leg protector 10. In this example, in order to deform the leg protector using this central plate member 18, energies for widening slit 32 and collapsing side end section 18a, 18b are necessary, in addition to an energy overcoming the frictional force generated between the central plate member 18 and each side plate member 14, so that a greater impact energy than in the example of FIG. 3 can be absorbed.

FIG. 5 is a further modified example of central plate member 18 of the present invention, in which each side end section 18a, 18b is formed with openings 34 each of which is oval in cross-sectional. Also with this example, the impact energy absorbable is adjustable in connection with the frictional force between central plate member 18 and each side plate member. It will be understood that opening 34 may be formed in the various shapes other than the shape shown in FIG. 5.

FIG. 6 shows a still further modified example of central plate member 18 of the present invention, in which aligned cuts 36 like sewing-machine stitches are formed parallel with side edge E in the vicinity of each side end section 18a, 18b. With aligned cuts 36, the rigidity of central plate member 18 can be additionally adjustable.

FIG. 7 and 8 illustrates a third embodiment of leg protector 10 according to the present invention. In this embodiment, central plate member 18 is securely interposed between left and right side plate members 14, 16. The central plate member is formed at both side end sections thereof with elongate flange or bent portions 18A, respectively, each of which extends in the forward direction of the vehicle body or the direction opposite legs $L_1$, $L_2$ of the driver. Accordingly, each of left and right side plate members 14, 16 is formed at side end sections thereof with inner and outer flange or bent portions 14A, 16A which are parallel to flange portions 18A. As shown, opposite flange sections 18A 18 are fixed to inner flange portions 14A, 16A respectively, by means of bolt-nut connections 38, so that bolts 38a pass through both flange portions of the central plate member and each side plate member. The flange portions may be connected with each other, for example, by means of riveted joints or spot welding.

Furthermore, the central plate member 18 is smaller in thickness (i.e. less rigid than members 14, 16) than left and right side plate members. Additionally, the connecting force or mechanical strength between each flange portion 18A and each flange portion 14A, 16A is set lower than the rigidity or mechanical strength of central plate member 18. In other words, in this embodiment, the rigidities of central plate member 18 and connecting sections C to each side plate member 14, 16 are both lower than that of each side plate member. The rigidity of connecting sections C is generated by the frictional resistance between each flange portion 18A and each flange portion 14A, 16A, which resistance is due to the binding force by the bolt-nut connection.

Figure 9:
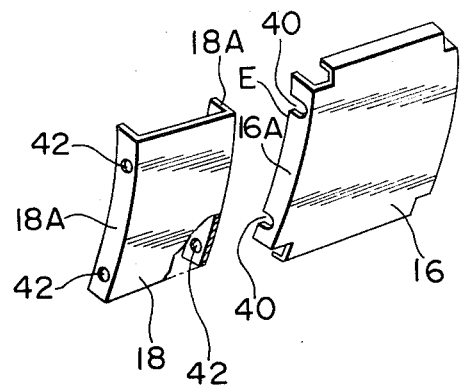
FIG. 9 is an enlarged perspective and exploded view showing a part of FIG. 7.

As shown in FIG. 9, inner flange portion 16A of each side plate section 16 is formed with two openings 40 elongated generally in the forward direction of the vehicle body and opens to E of the flange portion. Each flange portion 18A of central plate member 18 is formed with two circular openings which are located corresponding to the elongate openings 40 of each inner flange portion 14A, 16A. A bolt 38 passes through each opening 42 of central plate member flange portion 18A and the corresponding elongate opening 40 of each side plate member flange portion 16A, so that the adjacent flange portions 18A, 16A are connected with each other by means of the bolt-nut connection. It will be understood that the strength of the connecting force of connecting sections C can be suitably set by selecting the number of bolt-nut connections 38 or of rivets in case of using spot welding or rivet joints, and otherwise by selecting the number of welding-spots in case of using spot welding. In order to make vary the rigidity between central plate member 18 and side plate members 14, 16, it is effective to vary the thickness of the plate members, or to form a plurality of aligned cuts like sewing-machine stitches. In this embodiment, the rigidity of at least one of central plate member 18 and each connecting section C is made lower than that of each side plate member 14, 16.

It will be appreciated from the foregoing, that the leg protector of the embodiment shown in FIGS. 7, 8 and 9 operates in the same manner as in the embodiment shown in FIG. 1 with an advantage in which the flange portions of the plate members 14, 16, 18 are prevented from projecting toward the driver even during vehicle collision, since connecting sections C are located at the opposite side of the driver relative to the plate members.

Figure 10A:
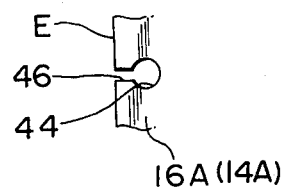
FIG. 10A is a fragmentary view of a side end section of a modified example of each side plate member of the leg protector.
Figure 10B:
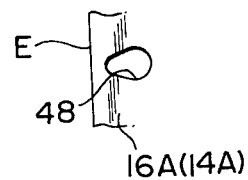
FIG. 10B is a fragmentary view similar to FIG. 6A, but showing another modified example of the side plate member.

FIGS. 10A and 10B show modified examples of the side plate members 14, 16. In example of FIG. 10A, each inside flange portion 14A, 16A of the side plate members 14, 16 is formed with circular openings 44 through which bolts 38a, the rivets or like pass. Additionally, a slit 46 is formed to connect each opening 44 and side edge E of the flange portion 14A, 16A and opens to the side edge E. With this example, in order to deform leg protector 10, energies for widening slit 46 and for collapsing the edge section of flange portions 14A, 16A are necessary in addition to an energy overcoming the frictional force generated between the central plate member flange portion and each side plate member flange portion, so that a greater impact energy than in the example shown in FIG. 9 can be absorbed. In the example of FIG. 10B, each inside flange portion 14A, 16A is formed with openings 48 each of which is egg-shaped in cross-section. Also with this example, the absorbable impact energy is adjustable in connection with the frictional force generated between the central plate member 18 and each side plate member 14, 16. It will be understood that the opening 48 may be formed in the various shapes other than in FIG. 10B.

Figure 11:
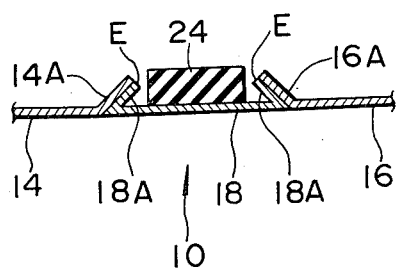
FIG. 11 is a transverse cross section, partly omitted, of a fourth embodiment of the leg protector in accordance with the present invention.

FIG. 11 illustrates a fourth embodiment of the leg protector according to the present invention, which is similar to the embodiment of FIG. 7 with the exception that the flange portions 18A are bent inside at an angle of 45 degrees in a manner that the edges E of the flange portions face each other; and the inside flange portions 14A, 16A of the side plate members 14, 16 are bent inside at an angle of 45 degrees in a manner that the surfaces of the inside flange portions 14A, 16A contact the surfaces of the bent flange portions 18A of the central plate member 18. Accordingly, the central plate member 18 is securely supported between the left and right side plate members 14, 16. In this instance, the adjacent and contacting flange portions 18A, 14A (16A) are fixed with each other by means of spot weldings. With this arrangement, in order that the central plate member 18 moves forward relative to the side plate members 14, 16, the bending of the main body of central plate member and of the flange portions 18A are necessary in some cases, so that a much greater impact energy than in the embodiment of FIG. 7 can be absorbed. As discussed above, the impact energy can be absorbed by the deformation of the central plate member 18, and therefore it is not necessarily required to fasten the adjacent and contacting flange portions 18A, 14A (16A) by means of welding-spots, bolts or the like.

As will be appreciated from the above, according to the present invention, the leg protector is constructed of left and right side plate members disposed between the steering column and the vehicle driver, and a central plate member connecting both the side plate members. Additionally, the rigidity of at least one of the central plate member with each connecting section of the central plate member with each side plate member is lower than that of the side plate members. Therefore, the impact energy of the vehicle driver can be effectively converted into the energy required for deformation or breakage of the central plate member, or for peeling off the central plate member from each side plate member. As a result, the driver's impact energy can be certainly absorbed and accordingly the vehicle driver is effectively protected, thereby improving vehicle safety. Furthermore, the leg protector according to the present invention is simple in construction and low in production cost, and does not contribute to increase in vehicle weight, which is effective for fuel economy.

What is claimed is:

1. A driver and passenger leg protector for use in an automotive vehicle having a steering column, comprising:
   first and second side plate members securely connected to a vehicle body and located between the steering column and legs of a driver, said first and second side plate members being in lateral alignment with and spaced apart from each other;
   a central plate member located facing the steering column and disposed contacting said first and second side plate members, said central plate being a rigid member receiving and absorbing kinetic energy transmitted thereto by the first and second plates contacting the driver's legs;
   means for fastening said central plate member onto said first and second side plate members;
   at least one of said central plate member and said fastening means being of less mechanical strength than said first and second side plate members.

2. A leg protector as claimed in claim 1, wherein said central plate member is less in thickness than said first and second side plate members.

3. A leg protector as claimed in claim 1, wherein said central plate member is located on said first and second side plate members at surfaces facing the driver's legs.

4. A leg protector as claimed in claim 3, wherein said central plate member is formed with opposite first and second side end sections located respectively on said first and second side plate members.

5. A leg protector as claimed in claim 4, wherein said fastening means includes welding-spots positioned at the side end sections of said central plate member.

6. A leg protector as claimed in claim 4, wherein each side end section of said central plate member is formed with first openings, and an inner side end section of each of said first and second side plate members is formed with second openings, said second openings being located generally corresponding to said first openings, respectively.

7. A leg protector as claimed in claim 6, wherein said fastening means includes rigid members each of which is passed through the first and second openings to fasten the side end section of said central plate member onto the inner side end section of one of said first and section side plate members.

8. A leg protector as claimed in claim 7, wherein each first opening is an elongate opening which extends laterally and opens to a side edge of said central plate member.

9. A leg protector as claimed in claim 7, wherein each first opening includes a generally circular section and a slit section which merges at one end thereof into said circular section and opens the other end to the side edge of said central plate member.

10. A leg protector as claimed in claim 7, wherein each first opening is oval-shaped in cross-section.

11. A leg protector as claimed in claim 7, wherein each rigid member is a rivet formed by riveting.

12. A leg protector as claimed in claim 4, further including means defining aligned sewing-machine stitch-like cuts formed on said central plate member to reduce the mechanical strength thereof in relation to the first and second side plate members.

13. A leg protector as claimed in claim 1, wherein said central plate member is securely interposed between said first and second side plate members so that the surfaces, facing the driver, of said central and side plate members are generally on a common plane.

14. A leg protector as claimed in claim 13, wherein said central plate member is formed at both side ends thereof with first and second flange portions which project generally in the forward direction of the vehicle body, and each of said first and second side plate members is formed at an inner side end thereof with a flange portion contacting one of said first and second flange portions of said central plate member, in which said fastening means fastens said first and second flange portions of said central plate member respectively with said flange portions of first and second side plate member.

15. A leg protector as claimed in claim 14, each of said first and second flange portions of the central plate member being formed with first openings, and each of said flange portions of said first and second side plate members being formed with second openings, said second openings generally corresponding to said first openings, respectively.

16. A leg protector as claimed in claim 15, wherein said fastening means includes rigid members each of which passes through each first and second opening to fasten each of said first and second flange portions of said central plate member to said flange portion of each side plate member.

17. A leg protector as claimed in claim 16, wherein each second opening is an elongate opening which extends laterally and opens to a side edge of said flange portion of each side plate member.

18. A leg protector as claimed in claim 16, wherein each second opening includes a generally circular section and a slit section which merges at one end thereof into said circular section and opens at the other end to the side edge of said flange portion of each side plate member.

19. A leg protector as claimed in claim 16, wherein each second opening is oval-shaped in cross-section.

20. A leg protector as claimed in claim 16, wherein each rigid member is a bolt passing through each first and second opening of said flange portions.

21. A leg protector as claimed in claim 14, wherein said first and second flange portions of said central plate member form an acute angle with the surface, facing the driver, of said central plate member so that the side edges of the bent first and second flange portions face each other, and said flange portion of each side plate member forms the acute angle with the surface, facing the driver, of said central plate member so that one of said first and second flange portions of said central plate member contacts said flange portion of one of said side plate members.

22. A leg protector as claimed in claim 1, further comprising an energy absorbing pad secured to a surface, facing to the steering column, of said central plate member.

23. A driver and passenger leg protector for use in an automotive vehicle having a steering column, comprising:
  (a) first and second side plate members securely connected to a vehicle body and located between a steering column and legs of a driver, said first and second side plate members being in lateral alignment with and spaced apart from each other;
  (b) a central plate member located facing the steering column and disposed contacting said first ans second side plate members, said central plate member having lateral side edges engaging corresponding inner edges of the first and second plates, said central plate being a rigid member; and
  (c) means for fastening the side edges of said central plate member to the inner edges of each said first and second side plate member.

* * * * *